US010051262B2

(12) United States Patent
Lu

(10) Patent No.: US 10,051,262 B2
(45) Date of Patent: Aug. 14, 2018

(54) CONTROL CIRCUIT OF HIGH-DEFINITION NAKED-EYE PORTABLE STEREOSCOPIC VIDEO PLAYER AND STEREOSCOPIC VIDEO CONVERSION METHOD

(71) Applicant: HANGZHOU 3DWORLD TECHNOLOGY CO., LTD., Hangzhou (CN)

(72) Inventor: Xiaofen Lu, Hangzhou (CN)

(*) Notice: Subject to any disclaimer, the term of this patent is extended or adjusted under 35 U.S.C. 154(b) by 146 days.

(21) Appl. No.: 15/306,999

(22) PCT Filed: Oct. 14, 2014

(86) PCT No.: PCT/CN2014/088586
§ 371 (c)(1),
(2) Date: Oct. 27, 2016

(87) PCT Pub. No.: WO2015/192557
PCT Pub. Date: Dec. 23, 2015

(65) Prior Publication Data
US 2017/0048514 A1 Feb. 16, 2017

(30) Foreign Application Priority Data
Jun. 19, 2014 (CN) .......................... 2014 1 0275205
Jun. 19, 2014 (CN) ...................... 2014 2 0328358 U

(51) Int. Cl.
H04N 13/04 (2006.01)
H04N 13/00 (2018.01)
(Continued)

(52) U.S. Cl.
CPC ..... H04N 13/0402 (2013.01); G02B 27/2228 (2013.01); H04N 13/0029 (2013.01);
(Continued)

(58) Field of Classification Search
CPC ............. H04N 13/044; H04N 13/0029; H04N 13/0497; H04N 13/0447; G02B 27/2228
(Continued)

(56) References Cited
U.S. PATENT DOCUMENTS

2011/0134212 A1* 6/2011 Neuman ............ H04N 13/0029
348/42
2012/0169843 A1* 7/2012 Luthra ............... H04N 13/0051
348/43
2013/0016193 A1* 1/2013 Nepveu ................ G02B 27/017
348/51

FOREIGN PATENT DOCUMENTS

CN 2074464 U 4/1991
CN 101382662 A 3/2009
(Continued)

Primary Examiner — Thai Tran
Assistant Examiner — Jose Mesa

(57) ABSTRACT

The present invention relates to a control circuit of a high-definition naked-eye portable stereoscopic video player and a stereoscopic video conversion method which enables the user to watch a stereoscopic video without wearing the stereoscopic glasses, wherein the control circuit includes a power supply. An HD video CH1 and an HD video CH2 are connected to the signal input terminal of a respective HDMI decoder through a respective HDMI plug interface, the signal output terminal of the HDMI decoder is connected to the signal input terminal of an FPGA programmable logic device. A DDR2 memory, a SRAM Static Random Access Memory, and a FLASH memory bi-directionally exchange data with the FPGA programmable logic device.

21 Claims, 7 Drawing Sheets

(51) Int. Cl.
  *H04N 21/414* (2011.01)
  *H04N 21/426* (2011.01)
  *H04N 21/433* (2011.01)
  *H04N 21/4363* (2011.01)
  *H04N 21/81* (2011.01)
  *G02B 27/22* (2018.01)
  *H04M 1/725* (2006.01)

(52) U.S. Cl.
  CPC ....... *H04N 13/044* (2013.01); *H04N 13/0447* (2013.01); *H04N 13/0486* (2013.01); *H04N 13/0497* (2013.01); *H04N 21/41407* (2013.01); *H04N 21/4263* (2013.01); *H04N 21/4331* (2013.01); *H04N 21/43635* (2013.01); *H04N 21/816* (2013.01); *H04M 1/725* (2013.01); *H04M 2250/16* (2013.01)

(58) Field of Classification Search
  USPC .......................................................... 348/51
  See application file for complete search history.

(56) References Cited

FOREIGN PATENT DOCUMENTS

| | | |
|---|---|---|
| CN | 101594549 A | 12/2009 |
| CN | 101609249 A | 12/2009 |
| CN | 102572482 A | 7/2012 |
| CN | 103676168 A | 3/2014 |

* cited by examiner

CONTROL CIRCUIT OF HIGH-DEFINITION NAKED-EYE PORTABLE STEREOSCOPIC VIDEO PLAYER AND STEREOSCOPIC VIDEO CONVERSION METHOD

CROSS REFERENCE TO RELATED APPLICATIONS

This application is a continuation of International Application No. PCT/CN2014/088586, filed on Oct. 10, 2014, which is based upon and claims priority to Chinese Patent Application No. 201410275205.0 filed on Jun. 19, 2014, and Chinese Patent Application No. 201420328358.2 filed on Jun. 19, 2014, the entire contents of which are incorporated herein by reference.

TECHNICAL FIELD

The present invention relates to a control circuit of a high-definition naked-eye portable stereoscopic video player and a stereoscopic video conversion method which enables the user to watch a stereoscopic video without wearing the stereoscopic glasses. The present invention belongs to the field of manufacturing a microscopic stereoscopic video player/viewer.

BACKGROUND ART

1. A patent titled "stereoscopic display viewable by naked eyes" (CN101594549A) includes a black baffle (2), a right convex lens (3), a left convex lens (4) and an LCD video player (7). The display is a box, a top panel of which is parallel to a bottom panel. The black baffle (2) forms three sides of the box. The right convex lens (3) and the left convex lens (4) are installed in a convex lens installing round hole of the top panel through an optical axis thereof in a parallel way respectively. The distance between the optical axis of the right convex lens (3) and the optical axis of the left convex lens (4) is 6-7 cm. The LCD video player (7) includes a screen (1), wherein the screen (1) is a display of the LCD video player (7), and the screen (1) includes a right screen (10) and a left screen (11). The right screen (10) and the left screen (11) are located in the left half part and the right half part of the screen (1) respectively. The right screen (10) and the left screen (11) are fixed on the upper surface of the bottom panel in such a way that the right screen (10) and the left screen (11) are located below the right convex lens (3) and the left convex lens (4) respectively. The distance between the screen (1) of the LCD video player (7) and the right convex lens (3) and the left convex lens (4) is 8-12 cm. The LCD video player (7) further includes a USB data transmission port (6). the USB data transmission port (6) is installed on the left side panel of the black baffle (2). See FIG. 2 and FIG. 3.

The disadvantages are as follows: first, the patent recites "the distance between the optical axis of the right convex lens (3) and the optical axis of the left convex lens (4) is 6-7 cm", and "the distance between the screen (1) of the LCD video player (7) and the right convex lens (3) and the left convex lens (4) is 8-12 cm", which indicates that the shortest focal distance of the optical convex lens is 8 cm. The screens as shown in the figure of the patent are arranged side by side. The maximum size of the single image arranged in parallel is unlikely to exceed 6.5 cm which is the distance between eyes of a person. The normal view angle of a film should be optically designed more than 40°. The amplification factor should be more than 3 times. The diameter of the lens is about 2 cm (this also complies with that the convex lens of the patent is a small round lens as shown in the figure). As the diameter of the lens is small, the eyes of the user should be as close as possible to the lens during watching. This mode is not substantially different from the head-mounted stereoscopic display sold in the market. It does not have the basic characteristic that the eyes can freely move up and down, left and right, forward and backward in the naked-eye stereoscopic mode. Therefore, it is hard to be called the perfect naked-eye stereoscopic characteristic. Second, the width of the image is 6.5 cm. The resolution can be 1000 pixels at most according to the resolution of the mainstream product LCD screen of the current screen, which is only half of the high-definition screen. Third, the pixel of the LCD screen is viewed under a 3-time eyepiece through which large pixel grain can be seen. this cannot meet the basic viewing requirement of the non-grainy sense of the movies.

2. The previous patent CN90217663 of the inventor of the application is titled "stereoscopic display for stereogram". The stereoscopic display is provided with a shell (1), a planar reflector (2), a stereogram pair frame (3), a longitudinal partition board (4), a diffusion plate (5), an electric light source, a wire and a power line connecting to the electric light source. The upper end of the shell (1) is fixed to a plano-convex lens screen (6). The lens screen is composed of two identical rectangular plano-convex lenses that are combined together closely in parallel. The convex surface of the lens is oriented toward the inner cavity of the shell. The range of the focal length of the lens is 200-250 mm. The length of the lens screen is 120-140 mm. The width is 80-100 mm. The inclined inner wall of the middle of the shell (1) is fixedly provided with a rectangular planar reflector (2). The included angle between the plane of the planar reflector (2) and the lens screen (6) is 45°. The middle part of the shell which is opposite to the inner wall of the planar reflector is provided with an electric direct light source (7). The lower part of the shell is provided with the movable stereogram pair frame (3). The included angle of the plane of the frame and the planar reflector is 45°. The longitudinal partition board (4) is fixed at the middle part of the inner cavity of the shell (1) from the plano-convex lens screen to the stereogram pair frame. The diffusion plate (5) which is parallel to the framework (3) is arranged below the stereogram pair frame (3). An electric transmission light source (8) is arranged below the diffusion plate (5). a change-over switch (9) of the electric direct light source and the electric transmission light source is provided on the step on the outer surface of the lower part of the shell (1) electric light source The change-over switch (9) is connected in series in the circuit of the electric light source. See FIG. 2 and FIG. 3. The patent recites that when the traditional stereoscopic viewing device uses the eyepiece with a short focal length to view the stereoscopic image, the eyes of the user must be as close as possible to the lens. The range in which the eyes can move with respect to the lens is very small. The stereoscopic image will disappear if the eyes depart from the specific position. The disadvantages of this patent are as follows: as the lens adopts the lens whose focus range of 200-250 mm, when the lens is the plano-convex lens (not the telescope), the size of focal length is 200 mm>the image width size of 65 mm. The magnification of the image cannot be more than 1 time. Therefore, the stereoscopic image formed by this patent technology must be the small-sized image, which can be served as a certain stereoscopic image for viewing, but cannot reach the visual effect of watching the large stereoscopic image in the cinema whose field angle is more than 40°.

SUMMARY OF THE INVENTION

Design Purpose: in order to avoid the defects of the background art, a control circuit of a high-definition naked-eye portable stereoscopic video player/viewer and a stereoscopic video conversion method which enables the user to watch a stereoscopic video without wearing the stereoscopic glasses are designed.

Design Solution: in order to achieve the above design purpose, the following solutions are provided. The application in the design: 1. the signal input terminal of the multi-channel HDMI interface or other video interface receives the high-definition video stream. The signal output terminal of the multi-channel HDMI interface or other video interface is connected to the signal input terminal of the HDMI decoder respectively. The signal output terminal of the HDMI decoder is connected to the signal input terminal of the FPGA respectively. The signal output terminal of the PFGA is connected to the signal input terminal of the interface of an MIPI mobile phone screen interface respectively. The output terminal of the MIPI mobile phone screen interface is connected to the high-definition mobile phone screen (1080p or more) respectively. The interface of the MIPI mobile phone screen is output as independent left and right eye signals. 2. The present invention is designed that a left eyepiece and a right eyepiece are directly opposite to a left eye reflector and a right eye reflector, and the left eye reflector and the right eye reflector form an included angle of 90°. The purpose of such design is as follows: as the display surface of a left liquid crystal display screen and the display surface of a right liquid crystal display screen are opposite to the mirror surface of a left eye reflector and the mirror surface of a right eye reflector respectively, and are transversely arranged, sights of a left eye and a right eye of a person pass through a left eyepiece and a right eyepiece to the left eye reflector and a right eye reflector respectively. As an included angle of the left eye reflector and the right eye reflector is 90°, the mirror surface of the left eye reflector and the mirror surface of the right eye reflector are opposite to the left eyepiece and the right eyepiece at an angle of 45° respectively. The sight of the left eye and that of the right eye of the person are reflected by the left eye reflector and the right eye reflector to images played on the left liquid crystal display screen and the right liquid crystal display screen. Since the distance between two eyes of the person is about 65 mm, two images of the same object at different angles are seen, such that a stereoscopic vision is generated via brain synthesis. 3. The sight partition board is designed to be located between the left eyepiece and the right eyepiece. The purpose of this design is as follows: it can separate the sight of the left eye and that of the right eye of the person, avoiding the corner of the left eye sees the right light path or the corner of the right eye sees the left light path, so as to ensure that the left light path and the right light path entering the brain are not mixed. Thus, the person who is viewing the stereoscopic video does not feel dizzy. 4. The shape of the eyepiece is designed as rectangular. The ratio of the length to the width is designed as 16:9. The size of the rectangular eyepiece is designed such that the length is about 65 mm, and the height is about 37 mm. The design in which the ratio is 16:9 is to match the ratio of 16:9 of the size of the current household television screen, so as to reach the unified standard of the television and Blue-ray movies. This is the fourth technical feature of the present invention. The purpose of such design is also as follows: since the distance between two eyes of a person is about 65 mm, the width of the rectangular eyepiece is also about 65 mm. At this time, the center of the eye of the person aligns the center of the lens. Two eyepieces are next to each other tightly. This is the maximum width size in the eyepieces design. With this width, the space distance between the eyeball and the lens is still 50 mm when the eye of the person is at a view angle of 50°. With this distance, if the eye of the person moves back and forth, the size of the image of a scene is changed, without changes of the definition. As a result, the moving range of the eye of the person is increased. Meanwhile, since the width of the single piece of lens is about 65 mm and the height thereof is 37 mm, the wide eyepiece size increases the range of moving upwards, downwards, leftwards, and rightwards. The viewing effect of the design has the basic characteristics of the naked-eye stereoscopic mode that the eye of the person can freely move upward, downward, leftward, rightward, forward, and backward. 5. The focal length of the eyepiece is designed according to 120 mm-200 mm. A left eyepiece and a right eyepiece are directly opposite to a left eye reflector and a right eye reflector. The left eye reflector and the right eye reflector are designed to form an included angle of 90°. This is the fifth technical feature of the present invention. The purpose of such design is that it can match the screen of about 5-inch. The mobile phone is the most mass-produced product in the image displaying industry in modern society. Its cost performance is the best. Currently, the mass-produced mobile phone screen can reach the requirements of the movie definition of 1080p. The minimum size is 5 inches. The width of the screen is XX mm and the height thereof is XX mm (width and height of the 5-inch screen are well-known parameters). In order to design the screen to be usable at a photopic vision distance (250 mm) without the grainy sense of pixels after amplification, the design of the magnification of the eyepiece should be between 1.3 times and 2.3 times. The focal length of the eyepiece which is designed according to 120-195 mm just meets this requirement. Since the width of the mobile phone screen is XX mm, two screens are arranged together in parallel, the center distance of which is more than XX mm (the width of the mobile phone screen is the well-known parameter, and the center distance of the two screens arranged together can be measured) which is far greater than the distance between eyes of the person which is 65 mm. The solution that the center of the eyepiece is directly opposite to the center of the image does not work. In this case, the design that a front-side reflector is located at an angle of 45° between the left eyepiece and the left image, and between the right eyepiece and the right image is adopted. This solution solves the problem of viewing the image whose width is more than 65 mm, which meets the requirement of practical use.

Technical solution 1: a control circuit of a high-definition naked-eye portable stereoscopic video player includes a power supply. A HD video CH1 and a HD video CH2 which are connected to the signal input terminal of a respective HDMI decoder through a respective HDMI plug interface. The signal output terminal of the HDMI decoder is connected to the signal input terminal of a FPGA programmable logic device A DDR2 memory, a SRAM Static Random Access Memory and a FLASH memory bi-directionally exchange data with the FPGA programmable logic device. The two signal output terminals of the FPGA programmable logic device are respectively connected to the signal input terminal of a MIPI 4 line encoder. The signal output terminal of the MIPI 4 line encoder is connected to the signal input terminal of a mobile phone screen.

Technical solution 2: a stereoscopic video conversion method of a control circuit of a high-definition naked-eye portable stereoscopic video player, wherein the signal input terminal of a multi-channel HDMI interface or other video interface receives a high-definition video stream. The signal output terminal of the multi-channel HDMI interface or other video interface is connected to the signal input terminal of a HDMI decoder respectively. wherein the signal output terminal of the HDMI decoder is connected to the signal input terminal of a FPGA respectively. The signal output terminal of the PFGA is connected to the signal input terminal of the interface of a MIPI mobile phone screen interface respectively. The output terminal of the interface of the MIPI mobile phone screen is connected to a high-definition mobile phone screen respectively. The interface of the MIPI mobile phone screen is output as independent left and right eye signals. The input high-definition stereoscopic video source is separated into two left and right eye synchronous independent videos by a high-definition naked-eye stereoscopic video player. Then, the left eye of a person is enabled to see the video for the left eye while the right eye is enabled to see the video for the right eye via the high-definition naked eyes stereoscopic video player.

Technical solution 3: a stereoscopic video left and right eye separating method, for the video source of the left-right format, the left half of an image is amplified twice in the horizontal direction so as to be used as the left eye image, while the right half of an image is amplified twice in the horizontal direction so as to be used as the right eye image. For the video source of the standard stereoscopic blue-ray stereoscopic format which is the former-latter frame format, the left video frame rate is fixed at 48 Hz so as to be used as the left video, while the right video frame rate is fixed at 48 Hz so as to be used as the right video.

Compared with the background art, in the present invention, first, the design in which the left eye reflector and the right eye reflector form the included angle of 90° realizes an arrangement in which the display surface of a left liquid crystal display screen and the display surface of a right liquid crystal display screen are at an included angle of 45° with the left eye reflector and the right eye reflector relatively, which not only reduces the volume of the display and thus is convenient to carry around, but also achieves the goal of high-definition viewing with naked eyes. Second, the left liquid crystal display screen and the right liquid crystal display screen are transversely opposite to the left eye reflector and the right eye reflector, realizing the viewing of the stereoscopic wide screen. Third, the manufacturing cost is low and the reliability is high. Fourth, the left and right eyepieces are made into two identical plano-convex lenses, each of which is a rectangular lens with a length of 80-100 mm and a width of 60-70 mm. With such a size of rectangular lens, the range in which the eye of the person can move with respect to the plano-convex lens screen is enlarged, and the user can comfortably sit in front of lens screen to watch the stereoscopic image without feeling tired.

DETAILED DESCRIPTION OF THE PREFERRED EMBODIMENTS

Figure 1:
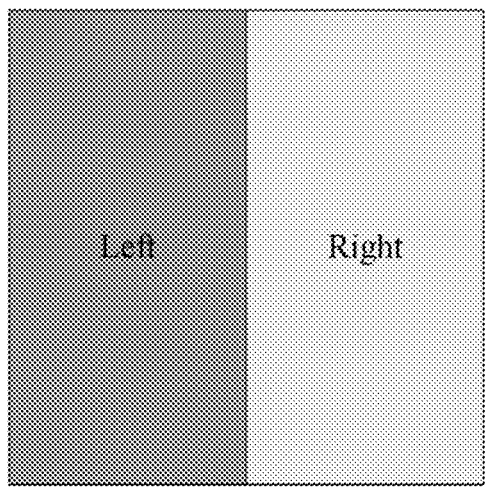
FIG. 1 is a left and right format stereoscopic video source, wherein the dark one corresponds to the left eye, and the light one corresponds to the right eye.

Embodiment 1 see FIG. 1 to FIG. 5. A control circuit of a high-definition naked-eye portable stereoscopic video player includes a power, a HD video CH1 and a HD video CH2. HD video CH1 and HD video CH2 are connected to the signal input terminal of respective HDMI decoder through respective HDMI plug interface. The signal output terminal of the HDMI decoder is connected to the signal input terminal of a FPGA programmable logic device. A DDR2 memory, a SRAM Static Random Access Memory and a FLASH memory bi-directionally exchange data with the FPGA programmable logic device. The two signal output terminals of the FPGA programmable logic device are respectively connected to the signal input terminal of a MIPI 4 line encoder. The signal output terminal of the MIPI 4 line encoder is connected to the signal input terminal of a mobile phone screen. The FPGA memory bi-directionally exchanges data with the DDR2 memory, and buffers the frame. The FPGA bi-directionally exchanges data with the SRAM. The SRAM carries out the frame buffering, the rotating of the video stream of the video image by 90° and 270° in real time, and the lossless rearrangement of each pixel during the rotating. The control circuit of a high-definition naked-eye portable stereoscopic video player uses keys to control the switching of various video source formats, the volume adjustment, and the video brightness adjustment. The function of a video rotation module inside the SRAM in the FPGA programmable logic device is that after the video data flow into the FPGA, the data is synchronized according to a local clock via a synchronization module. Then, the video data is written into the sram via a writing module of the sram. A sram selection module is used to select and determine into which sram the current video data are to be written. Then, the writing operation is conducted to sram1, sram2 and sram3 respectively via an io control module of the sram. At the same time of writing, the data in the sram need to be read out. The data of the sram is read via a sram reading module. The process needs to realize the frame buffering via a middle sram io control module. When sram1 is being written, sram 3 is being read. When sram2 is being written, sram2 is being read. When sram3 is being written, sram 2 is being read. It is controlled that the data being read is always the sram data written previously, so as to ensure that there is no misreading, overlapping or overwriting. Then, the data is output via an output module. The function of a video data control module in the FPGA programmable logic device is that after the sram video data is read out, the sram video data is written into a ddr2 memory via a ddr2 control signal, and are cached in the ddr2. Then, the data is read out via a ddr2 reading module. Two video data are output via the data output module. It should be noted that the output two video data are simultaneous and continuous. This is why the ddr2 is used as the cache. While reading the ddr2, the input signal can be received at the same time, so the ddr2 can also be written. The data output module caches one frame of the data that are read out by the ddr2. In addition, left and right eye images are cached alternately, so as to realize the synchronic output.

Figure 2:
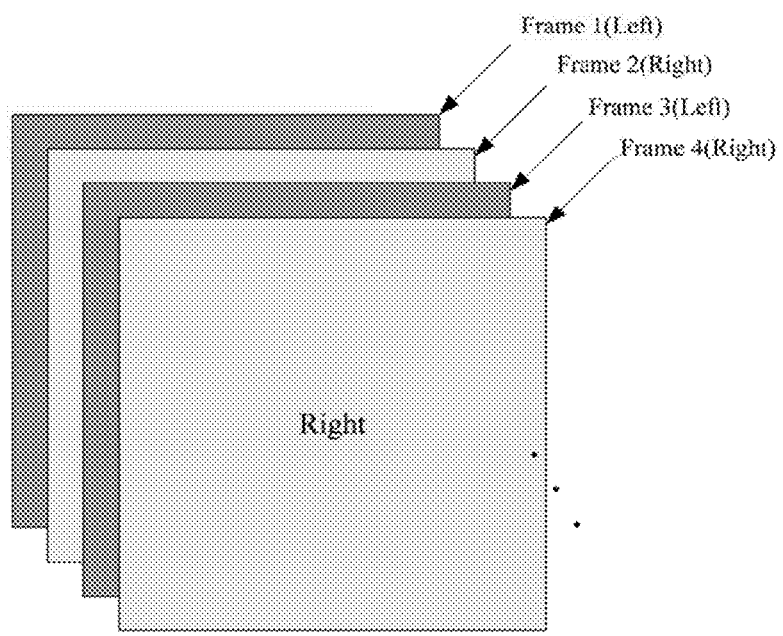
FIG. 2 is a front and back frame format stereoscopic video source, wherein the dark one corresponds to the left eye, and the light one corresponds to the right eye.
Figure 3:
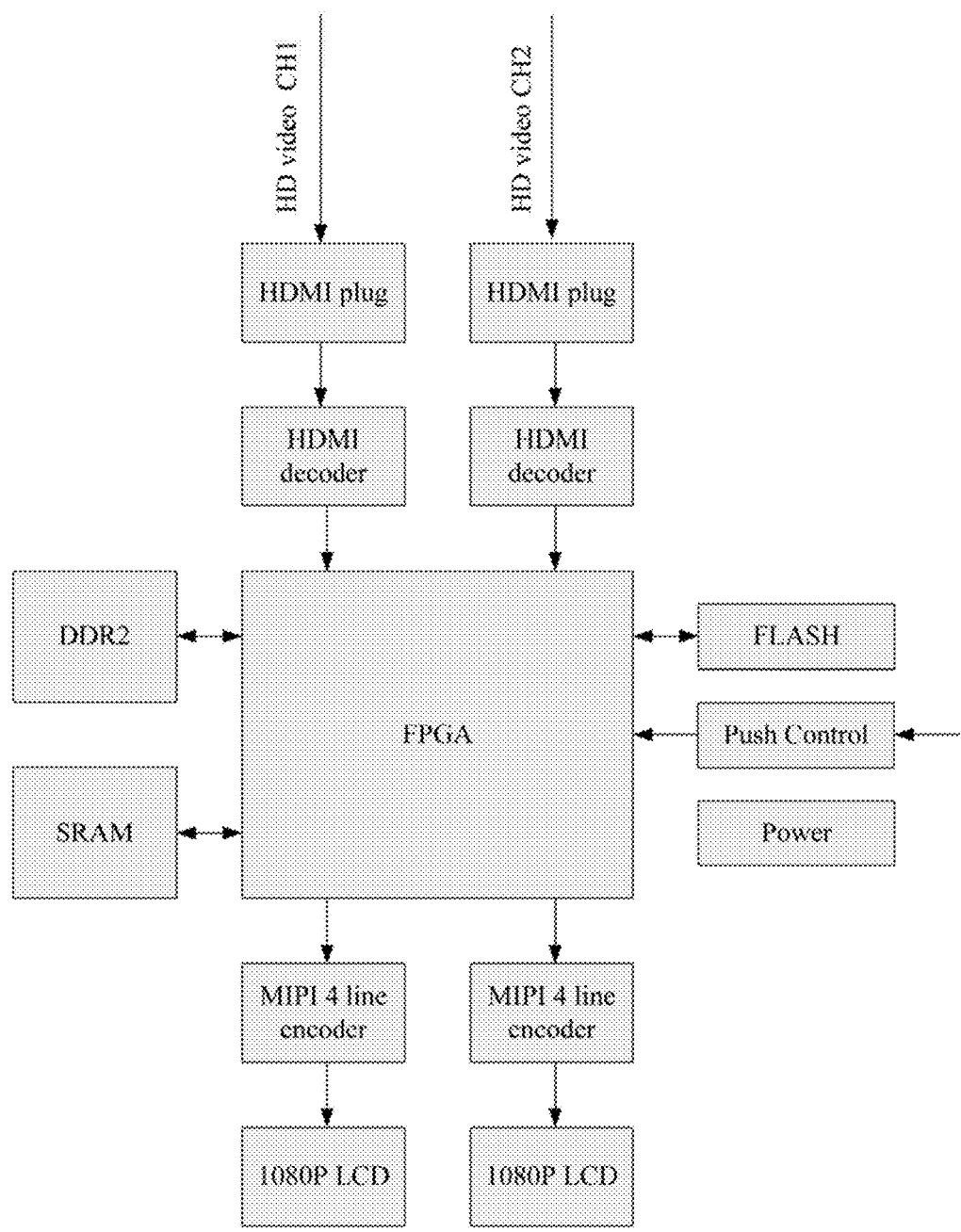
FIG. 3 is a schematic diagram of a super high-definition naked-eye portable stereoscopic video player/viewer.
Figure 4:
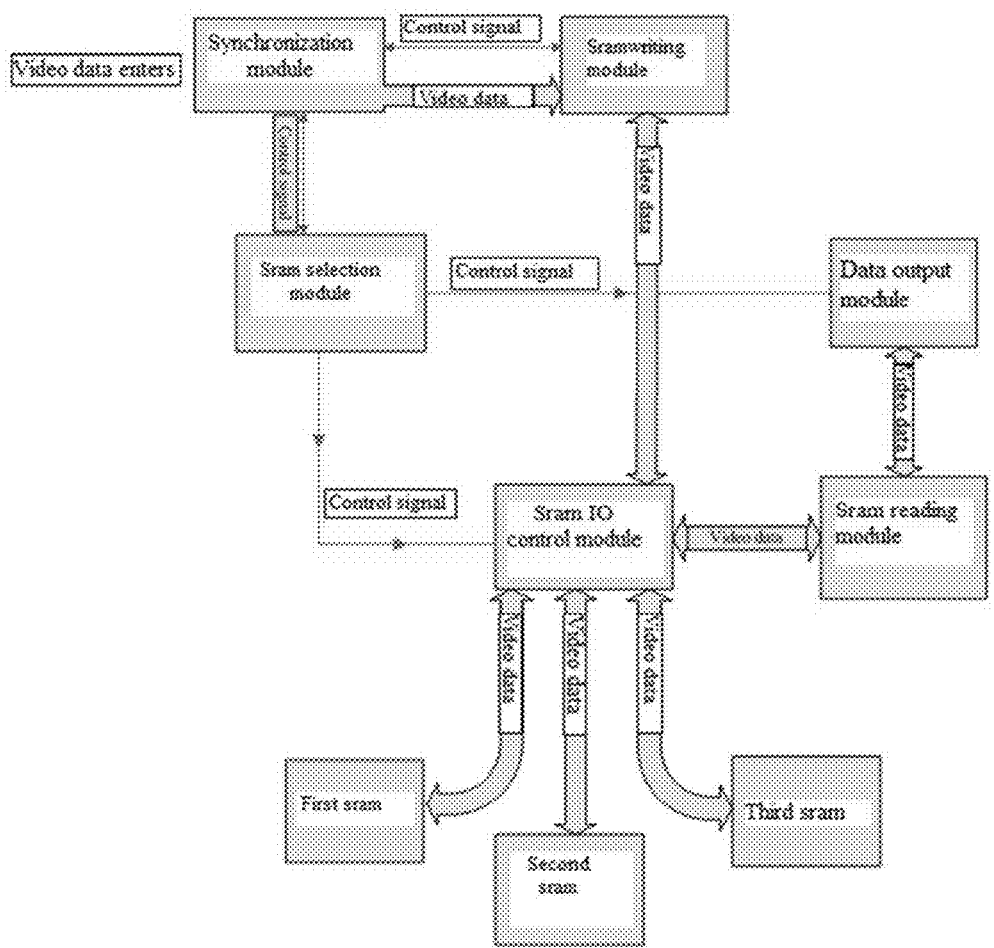
FIG. 4 is a schematic diagram of a video rotating module inside a RAM.
Figure 5:
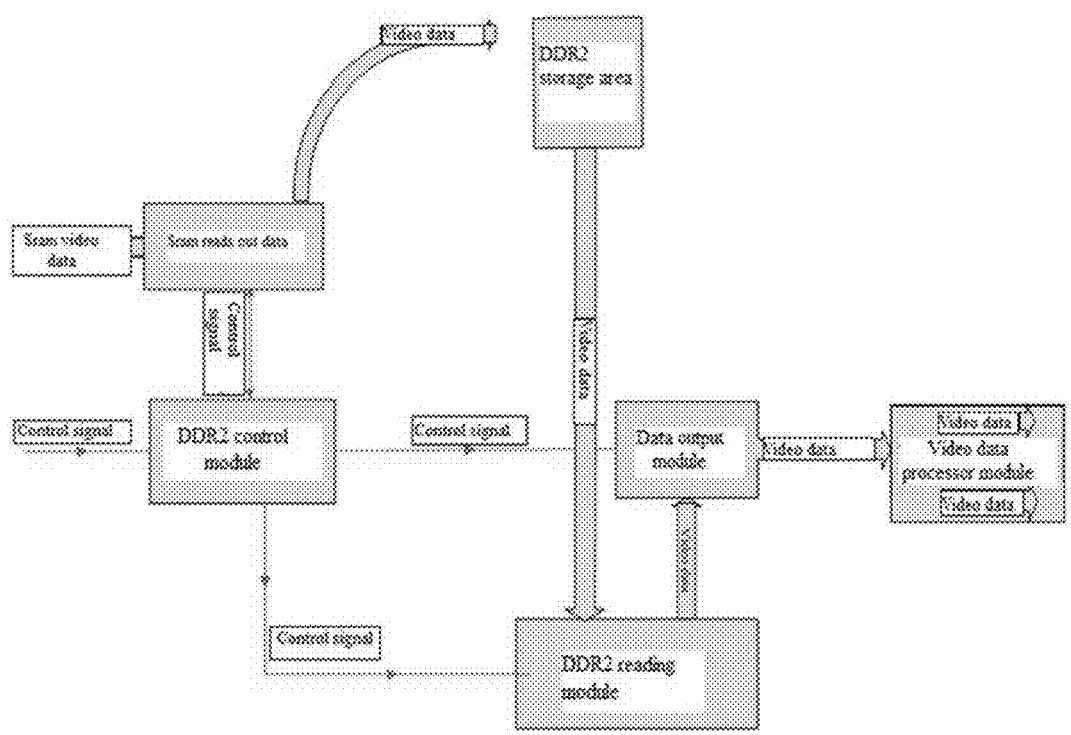
FIG. 5 is a schematic diagram of a video data control module.

See FIG. 2, the two LCD videos are high-definition LCD. 4-line MIPI interface is used, but it is not limited to the MIPI interface. The resolution is 1080*1920, but it is not limited to this resolution. The video image needs to be rotated by 90° in real time. Pixels need to be rearranged and combined during the rotating. The frame is buffered by the SRAM. Then, the video image is read out and rotated.

Embodiment 2

Figure 6:
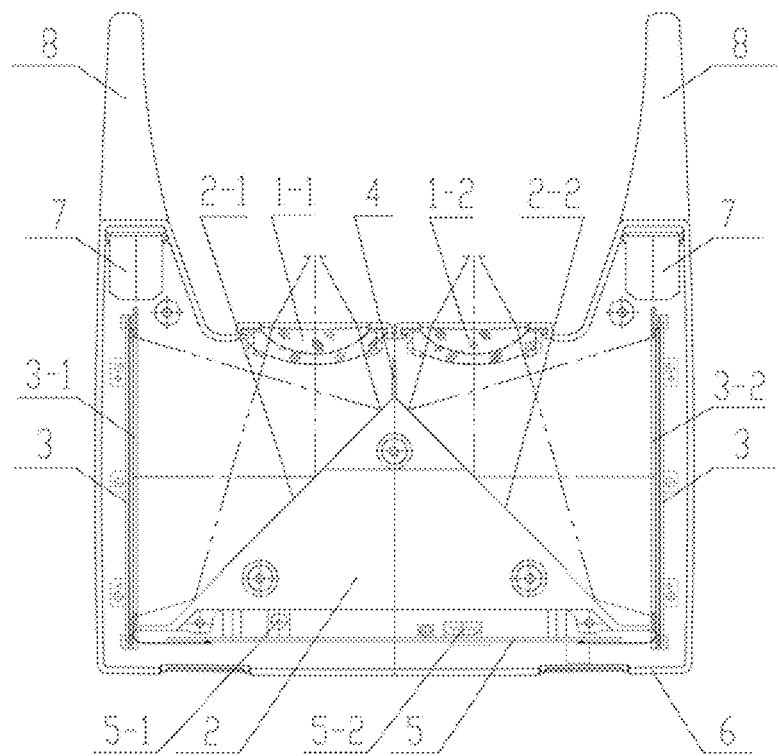
FIG. 6 is a top view structure diagram of the super high-definition naked-eye portable stereoscopic video player/viewer.
Figure 7:
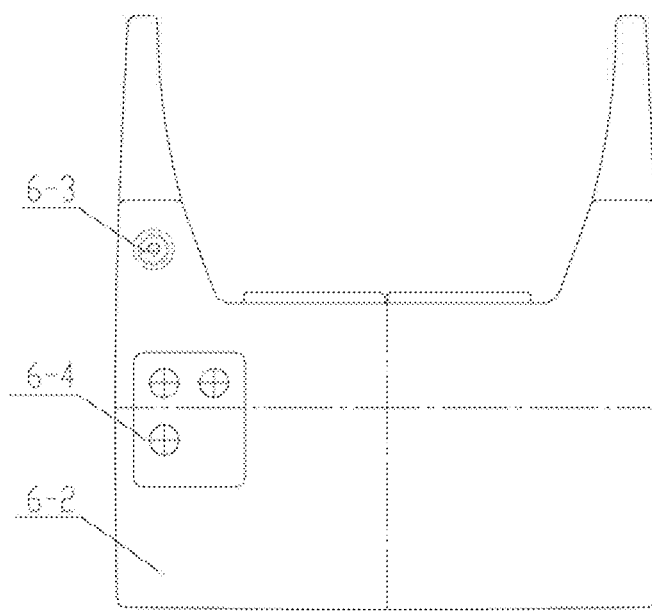
FIG. 7 is a bottom view structure diagram of FIG. 6.
Figure 8:
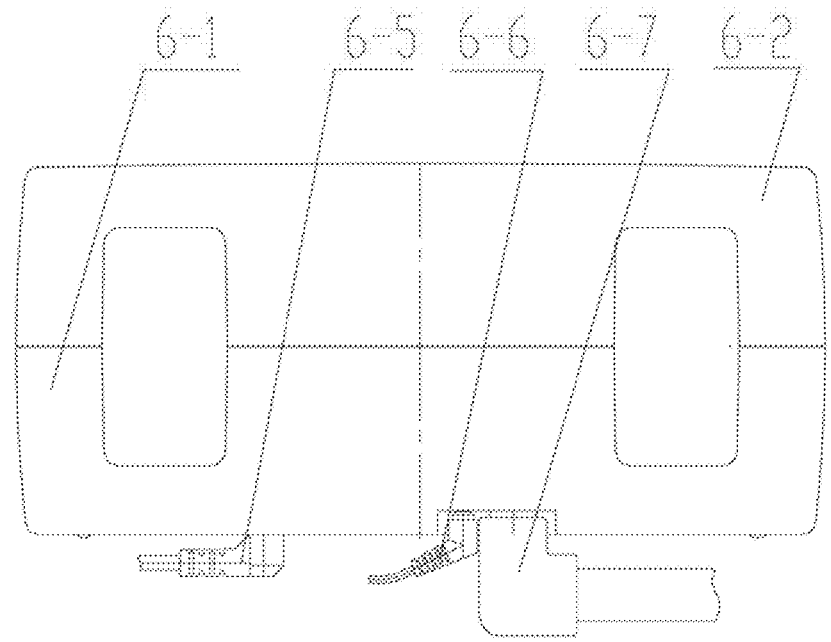
FIG. 8 is a rear view structure diagram of FIG. 6.
Figure 9:
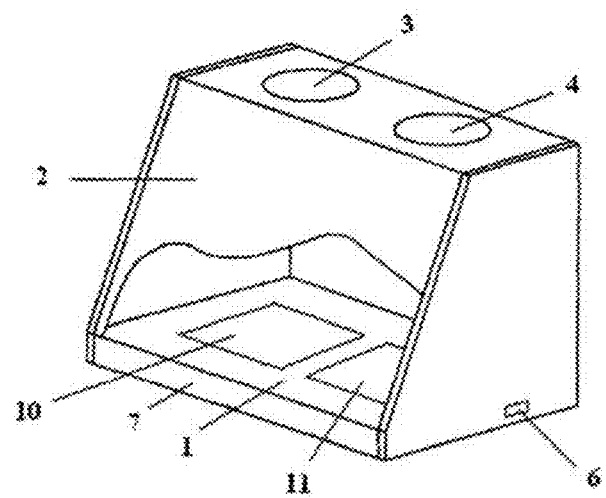
FIG. 9 and FIG. 10 are structure diagrams of the background art.
Figure 10:
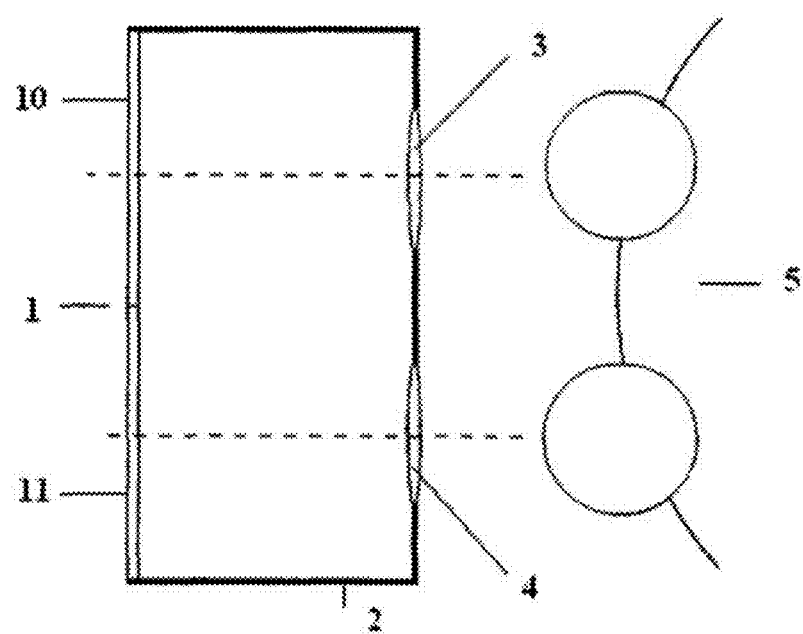

See FIG. 6 to FIG. 8. A stereoscopic video conversion method of a control circuit of a high-definition naked-eye portable stereoscopic video player, wherein the signal input terminal of a multi-channel HDMI interface or other video interface receives a high-definition video stream. The signal output terminal of the multi-channel HDMI interface or other video interface is respectively connected to the signal input terminal of a HDMI decoder. The signal output terminal of the HDMI decoder is respectively connected to the signal input terminal of a FPGA. The signal output terminal of the FPGA is respectively connected to the signal input terminal of the interface of a MIPI mobile phone screen. The output terminal of the interface of MIPI mobile phone screen is respectively connected to the high-definition mobile phone screen. The interface of the MIPI mobile phone screen is output as independent left and right eye signals. The input high-definition stereoscopic video source is separated into two left and right eye synchronous independent videos by a high-definition naked-eye stereoscopic video player. Then, the left eye of a person is enabled to see the video of the left eye while the right eye is enabled to see the video of the right eye via the high-definition naked eyes stereoscopic video player.

The said high-definition stereoscopic video source format may be a left-right format or a standard stereoscopic blue-ray former-latter frame format. In the left-right format, the left half image is the left eye image, while the right half image is the right eye image. In the front-back frame stereoscopic format, the former frame image is the left eye image, and the latter frame image is the right eye image, and the left and right eye images are input alternately.

Right-angle reflector holder 2 in the high-definition naked-eye portable stereoscopic video player/viewer is a triangular structure and is located inside housing 6. Slopes on both sides of the right angle of the right-angle reflector holder 2 are fixedly provided with left eye reflector 2-1 and right eye reflector 2-2 that form an included angle of 90°. Left eyepiece 1-1 and right eyepiece 1-2 are directly opposite to left eye reflector 2-1 and right eye reflector 2-2 and are fixed on housing 6. The display surface of left liquid crystal display 3-1 and the display surface of right liquid crystal display 3-2 are respectively opposite to left eye reflector 2-1 and right eye reflector 2-2, and are respectively positioned by liquid crystal panel holder 3 located in housing 6. Sight partition board 4 is located between left eyepiece 1-1 and right eyepiece 1-2. One end of sight partition board 4 is connected to right angle end of right-angle reflector holder 2. One end of sight partition board 4 and the right angle end of right-angle reflector holder 2 are in an integrated injection molding connection structure. Stereoscopic video playing circuit board 5 is opposite to flaring of included angle between left liquid crystal display screen 3-1 and right liquid crystal display screen 3-2 and is located inside housing 6. Left and right horns 8 are located on both sides of the front part inside housing 6. Stereoscopic video playing circuit board 5 is provided with power socket 5-1, a signal input interface of stereoscopic video and audio 5-2, and a video and audio output interface. The video signal output terminal of stereoscopic video playing circuit board 5 is connected to the video signal input terminal of left liquid crystal display 3-1 and right liquid crystal display 3-2 respectively. Audio signal output terminal of stereoscopic video playing circuit board 5 is connected to the left and right horns respectively.

Left liquid crystal display screen 3-1 and right liquid crystal display screen 3-2 are mobile phone display screens. Left liquid crystal display screen 3-1 and right liquid crystal display screen 3-2 are transversely opposite to left eye reflector 2-1 and right eye reflector 2-2 respectively. Left eyepiece 1-1 and right eyepiece 1-2 are two identical plano-convex lenses, which are made of the rectangular lens with a length of 80-100 mm and a width of 60-70 mm. With such a size of the rectangular lens, "the range in which the eyes can move with respect to the plano-convex lens screen is enlarged, and the user can comfortably sit in front of lens screen to watch the stereoscopic image without feeling tired". Left liquid crystal display screen 3-1 and right liquid crystal display screen 3-2 are a 1080P LCD display screen or 1080P. The size of left liquid crystal display screen 3-1 and that of right liquid crystal display screen 3-2 are 3-inch~8-inch screens.

Housing 6 includes lower housing 6-1 and upper housing 6-2. The front end of housing 6 is a groove structure. Upper housing 6-2 of housing 6 is provided with power supply key 6-3 and function key 6-4. The bottom of lower housing 6-1 of housing 6 is provided with power supply plug hole 6-5, headset plug hole 6-6 and HDMI plug hole 6-7. Both sides of the front part of housing 6 are respectively provided with left and right sound channels 8.

Embodiment 3 on the basis of above Embodiments, a method of separating stereoscopic video of left and right eye is provided. For the video source of the left-right format, the left half of the image is amplified twice in the horizontal direction so as to be used as the left eye image. The right half of the image is amplified twice in the horizontal direction so as to be used as the right eye image. For the video source of the standard stereoscopic blue-ray stereoscopic format which is the former-latter frame format, the left video frame rate is fixed at 48 Hz so as to be used as the left video, while the right video frame rate is fixed at 48 Hz so as to be used as the right video. It should be noted that although the above embodiments describe the concept of the present invention in detail, the literal description is only simple literal description of the concept of the present invention, without limiting the conception of the present invention. Any combination, addition or amendment that does not go beyond the concept of the present invention falls within the scope of the invention.

The invention claimed is:

1. A control circuit of a high-definition naked-eye portable stereoscopic video player, comprising a power supply, an HD video CH1, an HD video CH2, a plurality of HDMI plug interfaces, a plurality of HDMI decoders, each of which has a signal input terminal and a signal output terminal, an FPGA programmable logic device, having a signal input terminal and two signal output terminals, a DDR2 memory, a SRAM Static Random Access Memory, a FLASH memory, an MIPI 4 line encoder, having a signal input terminal and a signal output terminal, and a mobile phone screen, having a signal input terminal, wherein the HD video CH1 and the HD video CH2 are connected to the signal input terminal of respective HDMI decoder through respective HIM plug interface, wherein the signal output terminal of the HDMI decoder is connected to the signal input terminal of the FPGA programmable logic device, wherein the DDR2 memory, the SRAM Static Random Access Memory and the a FLASH memory bi-directionally exchange data with the FPGA programmable logic device, wherein the two signal output terminals of the FPGA programmable logic device are respectively connected to the signal input terminal of the MIPI 4 line encoder, and wherein the signal output terminal of the MIPI 4 line encoder is connected to the signal input terminal of a mobile phone screen.

2. The control circuit of a high-definition naked-eye portable stereoscopic video player according to claim 1, wherein the FPGA memory bi-directionally exchanges data with the DDR2 memory and buffers a frame.

3. The control circuit of a high-definition naked-eye portable stereoscopic video player according to claim 1, wherein the FPGA bi-directionally exchanges data with the SRAM.

4. The control circuit of a high-definition naked-eye portable stereoscopic video player according to claim 1, wherein the SRAM carries out a frame buffering, the rotating of a video stream of the video image by 90° and 270° in real time, and the lossless rearrangement of each pixel during the rotating.

5. The control circuit of a high-definition naked-eye portable stereoscopic video player according to claim 1, wherein the control circuit of a high-definition naked-eye portable stereoscopic video player uses keys to control the switching of various video source formats, a volume adjustment, and a video brightness adjustment.

6. The control circuit of a high-definition naked-eye portable stereoscopic video player according to claim 1, wherein a function of a video rotation module inside the SRAM in the FPGA programmable logic device is:
after the video data flow into the FPGA, synchronizing the data according to a local clock via a synchronization module,
then writing the video data into the sram via a writing module of the sram, wherein a sram selection module is used to select and determine into which sram current video data are to be written,
then conducting a writing operation to sram1, sram2 and sram3 respectively via an io control module of the sram, wherein at the same time of the writing, data in the sram need to be read out,
reading the data of the sram via a sram reading module, wherein this process needs to realize the frame buffering via a middle sram io control module,
wherein when sram1 is being written, sram3 is being read,
wherein when sram2 is being written, sram2 is being read,
wherein when sram3 is being written, sram2 is being read, and
wherein it is controlled that the data being read is always the sram data written previously, so as to ensure that there is no misreading, overlapping or overwriting, and wherein then the data is output via an output module.

7. The control circuit of a high-definition naked-eye portable stereoscopic video player according to claim 1, wherein a function of a video data control module in the FPGA programmable logic device is:
after sram video data is read out, writing the sram video data into a ddr2 memory via a ddr2 control signal, and caching the sram video data in the ddr2,
then reading the data via a ddr2 reading module,
outputting two video data via a data output module,
wherein the output two video data are simultaneous and continuous,
wherein while reading the ddr2, the input signal can be received at the same time, so the ddr2 can also be written,
wherein the data output module caches one frame of the data that are read out by the ddr2, and wherein left and right eye images are cached alternately, so as to realize synchronic output.

8. A stereoscopic video conversion method of a control circuit of a high-definition naked-eye portable stereoscopic video player comprising: receiving, by a signal input terminal of a multi-channel HDMI interface or other video interface, a high-definition video stream; wherein a signal output terminal of the multi-channel HDMI interface or other video interface is connected to the signal input terminal of a HDMI decoder respectively, a signal output terminal of the HDMI decoder is connected to a signal input terminal of a FPGA respectively, a signal output terminal of the FPGA is connected to a signal input terminal of an interface of a MIPI mobile phone screen respectively, an output terminal of the interface of the MIPI mobile phone screen is connected to a high-definition mobile phone screen respectively; and outputting the interface of the MIPI mobile phone screen as independent left and right eye signals; wherein the step of outputting the interface of the MIPI mobile phone screen as independent left and right eye signals comprises separating an input high-definition stereoscopic video source into two left and right eye synchronous independent videos by a high-definition naked-eye stereoscopic video player, so that a left eye of a person is enabled to see a video for the left eye while a right eye is enabled to see a video for the right eye via the high-definition naked eyes stereoscopic video player.

9. The stereoscopic video conversion method of the control circuit of a high-definition naked-eye portable stereoscopic video player according to claim 8, wherein the high-definition stereoscopic video source format is a left-right format or a standard stereoscopic blue-ray former-latter frame format.

10. The stereoscopic video conversion method of the control circuit of a high-definition naked-eye portable stereoscopic video player according to claim 9 comprising: alternately inputting a left eye image and a right eye image when in the former-latter stereoscopic frame format, wherein a former frame image is the left eye image, and a latter frame image is the right eye image; wherein in the left-right format, a left half of an image is the left eye image, and a right half of the image is the right eye image.

11. The stereoscopic video conversion method of the control circuit of a high-definition naked-eye portable stereoscopic video player according to claim 8, wherein a right-angle reflector holder in the high-definition naked-eye portable stereoscopic video player is a triangular structure and is located inside a housing, wherein slopes on both sides of the right angle of the right-angle reflector holder 2 are fixedly provided with a left eye reflector and a right eye reflector that form an included angle of 90°, wherein a left eyepiece and a right eyepiece are directly opposite to the left eye reflector and the right eye reflector and are fixed on the housing, wherein a display surface of a left liquid crystal display and a display surface of a right liquid crystal display are respectively opposite to the left eye reflector and the right eye reflector and are respectively positioned by a liquid crystal panel holder located in the housing, wherein a sight partition board is located between the left eyepiece and the right eyepiece, wherein a stereoscopic video playing circuit board is opposite to the flaring of the included angle between the left liquid crystal display screen and the right liquid crystal display and are located on both sides of a front part inside the housing, wherein left and right horns are located on both sides of the front portion inside the housing, wherein the stereoscopic video playing circuit board is provided with a power socket, a signal input interface of a stereoscopic video and audio, and a video and audio output interface, wherein a video signal output terminal of the stereoscopic video playing circuit board is connected to the video signal input terminal of the left liquid crystal display and the right liquid crystal display respectively, and wherein an audio signal output terminal of the stereoscopic video playing circuit board is connected to the left and right horns respectively.

12. The stereoscopic video conversion method of the control circuit of a high-definition naked-eye portable stereoscopic video player according to claim 11, wherein one end of the sight partition board is connected to the right angle end of the right-angle reflector holder.

13. The stereoscopic video conversion method of the control circuit of a high-definition naked-eye portable stereoscopic video player according to claim 12, wherein one end of the sight partition board and the right angle end of the right-angle reflector holder are in an integrated injection molding connection structure.

14. The stereoscopic video conversion method of the control circuit of a high-definition naked-eye portable stereoscopic video player according to claim 12, wherein both sides of the front part of housing are respectively provided with left and right sound channels.

15. The stereoscopic video conversion method of the control circuit of a high-definition naked-eye portable stereoscopic video player according to claim 12, wherein the left liquid crystal display screen and the right liquid crystal display screen are mobile phone liquid crystal display screens and are transversely opposite to the left eye reflector and the right eye reflector respectively.

16. The stereoscopic video conversion method of the control circuit of a high-definition naked-eye portable stereoscopic video player according to claim 12, wherein the left liquid crystal display screen and the right liquid crystal display screen are 1080 PLCD display screens.

17. The stereoscopic video conversion method of the control circuit of a high-definition naked-eye portable stereoscopic video player according to claim 12, wherein the left liquid crystal display screen and the right liquid crystal display screen are 3-inch~8-inch screens.

18. The stereoscopic video conversion method of the control circuit of a high-definition naked-eye portable stereoscopic video player according to claim 12, wherein the housing includes a lower housing and an upper housing.

19. The stereoscopic video conversion method of the control circuit of a high-definition naked-eye portable stereoscopic video player according to claim 12, wherein a front end of the housing is of a groove structure.

20. The stereoscopic video conversion method of the control circuit of a high-definition naked-eye portable stereoscopic video player according to claim 12, wherein the upper housing of the housing is provided with a power supply key and a function key.

21. The stereoscopic video conversion method of the control circuit of a high-definition naked-eye portable stereoscopic video player according to claim 12, wherein a bottom of the lower housing of the housing is provided with a power supply plug hole, a headset plug hole and an HDMI plug hole.

* * * * *